United States Patent
Liu et al.

(10) Patent No.: US 11,541,774 B2
(45) Date of Patent: Jan. 3, 2023

(54) CONTROL DEVICE AND BATTERY EXCHANGE METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Eddy Liu, New Taipei (TW); Wei-Da Yang, New Taipei (TW); Li-Quan Zhang, Shenzhen (CN); Qing Cai, Shenzhen (CN); Ming Lan, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 552 days.

(21) Appl. No.: 16/705,382

(22) Filed: Dec. 6, 2019

(65) Prior Publication Data
US 2021/0009001 A1    Jan. 14, 2021

(30) Foreign Application Priority Data
Jul. 10, 2019   (CN) .......................... 201910618047.7

(51) Int. Cl.
*B60L 53/80*   (2019.01)
*H02J 7/00*    (2006.01)
*B60L 53/66*   (2019.01)

(52) U.S. Cl.
CPC ............... *B60L 53/80* (2019.02); *B60L 53/66* (2019.02); *H02J 7/00036* (2020.01)

(58) Field of Classification Search
CPC ............. B60L 53/80; B60L 53/66; B60S 5/06
See application file for complete search history.

(56) References Cited

U.S. PATENT DOCUMENTS

| | | | |
|---|---|---|---|
| 2013/0054080 A1* | 2/2013 | Jacobson | B60L 53/80 701/32.4 |
| 2019/0009756 A1* | 1/2019 | Jacobs | G05D 1/0225 |

FOREIGN PATENT DOCUMENTS

| | | | | |
|---|---|---|---|---|
| ES | 2274597 T3 * | 5/2007 | | B60L 11/007 |

OTHER PUBLICATIONS

Machine translation of ES-2274597-T3 (Year: 2022).*

* cited by examiner

*Primary Examiner* — David V Henze-Gongola
(74) *Attorney, Agent, or Firm* — ScienBiziP, P.C.

(57) ABSTRACT

A battery exchange method is implemented in a control device communicatively coupled to a work machine and a battery exchange device. The method includes receiving a battery exchange request from the work machine, calculating a synchronization location and a synchronization time of the work machine and the battery exchange device, generating pre-judgment information, sending the pre judgment information and a synchronization command to the battery exchange device to control the battery exchange device to move toward the work machine according to the pre-judgment information and the synchronization command, continually receiving the first status information from the work machine and second status information from the battery exchange device, determining whether synchronization of the work machine and the battery exchange device is complete, and sending a battery exchange command to the battery exchange device to control the battery exchange device to exchange the battery of the work machine.

10 Claims, 4 Drawing Sheets

CONTROL DEVICE AND BATTERY EXCHANGE METHOD

FIELD

The subject matter herein generally relates to control devices, and more particularly to a control device implementing a battery exchange method for exchanging a battery of a work machine.

BACKGROUND

Automatic guided vehicles (AGVs) are increasingly used in automated logistics systems. In use, the AGV needs to return to a fixed AGV battery exchange base when the battery power of the AGV reaches 30-40% to exchange a battery of the AGV. However, it takes time for the AGV to return to the base, which reduces efficiency of the AGV.

BRIEF DESCRIPTION OF THE DRAWINGS

Implementations of the present disclosure will now be described, by way of embodiments, with reference to the attached figures.

DETAILED DESCRIPTION

Figure 1:
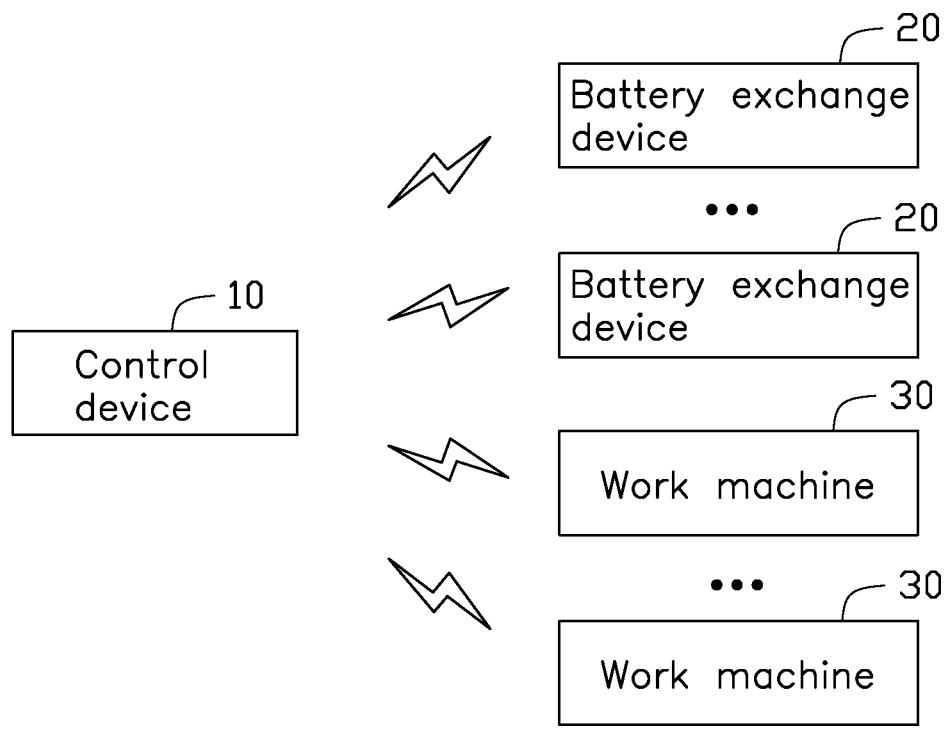
FIG. 1 is a schematic block diagram of an embodiment of a control device communicatively coupled to a plurality of battery exchange devices and a plurality of work machines.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a control device 10 in wireless communication with a plurality of work machines 30 and a plurality of battery exchange devices 20. Each work machine 30 is a battery-powered mobile device, including but not limited to, an electric forklift, an electric golf cart, or the like.

When the work machine 30 detects that a power of a battery reaches a certain value, such as 30-40%, the work machine 30 transmits first status information to the control device 10. The control device 10 selects a battery exchange device 20 according to the first status information and controls the battery exchange device 20 to exchange the battery of the work machine 30.

Figure 2:
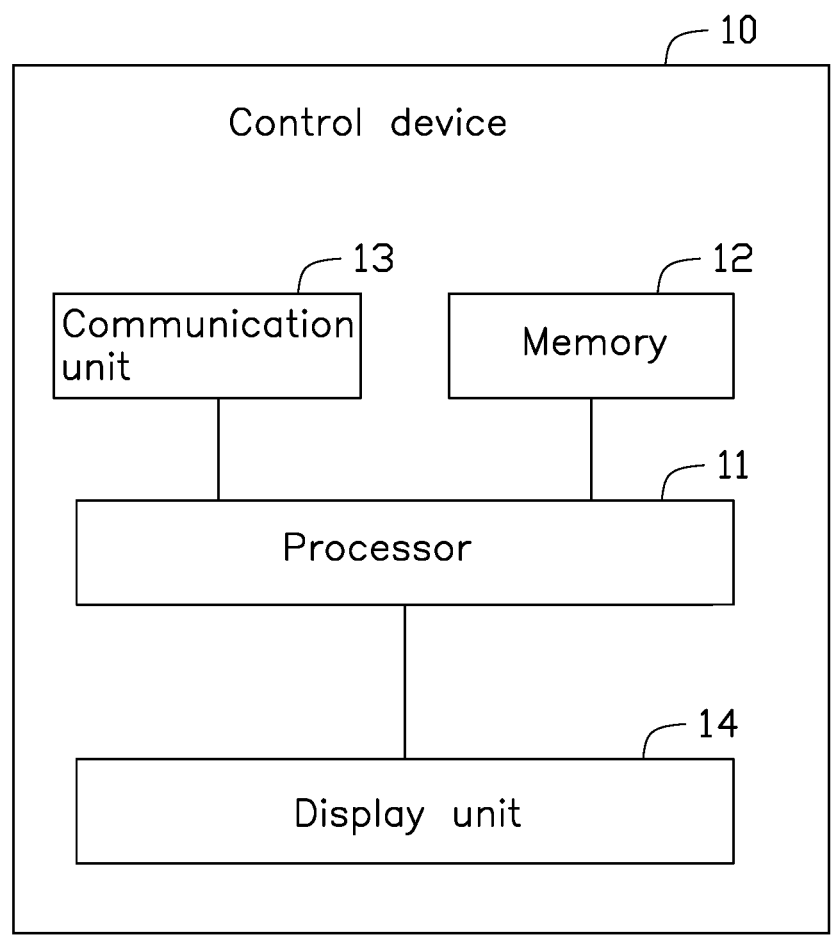
FIG. 2 is a block diagram of the control device in FIG. 1.

Referring to FIG. 2, the control device 10 includes a processor 11, a memory 12, a communication unit 13, and a display unit 14. The memory 12, the communication unit 13, and the display unit 14 are electrically coupled to the processor 11. In one embodiment, the processor 11, the memory 12, and the communication unit 13 can be integrated on a same device.

The processor 11 may be a central processing unit (CPU), a microprocessor, or other data processing chip.

The memory 12 stores various types of data in the control device 10, such as program codes and the like, and realizes high-speed, automatic completion of access of programs or data during the operation of the control device 10.

The memory 12 also stores status data of the battery exchange device 20 and the work machine 30.

The memory 12 can be a hard disk, a floppy disk, a random access storage device, or the like.

In one embodiment, the memory 12 can be an internal storage system, such as a flash memory, a random access memory, a read only memory, or the like.

In one embodiment, the memory 12 can also be a storage system, such as a memory card or data storage medium. The memory 12 also includes an unstable or stable storage device.

The communication unit 13 can directly communicate with the battery exchange devices 20 and the work machines 30 by wireless communication. A wireless communication method includes 5G communication, 4G communication, 3G communication, TCP/IP protocol, 2G communication, WiFi communication, BLUETOOTH communication, and the like.

The display unit 14 displays information processed by the processor 11. The display unit 14 can be a display, a touch screen, or the like.

Figure 3:
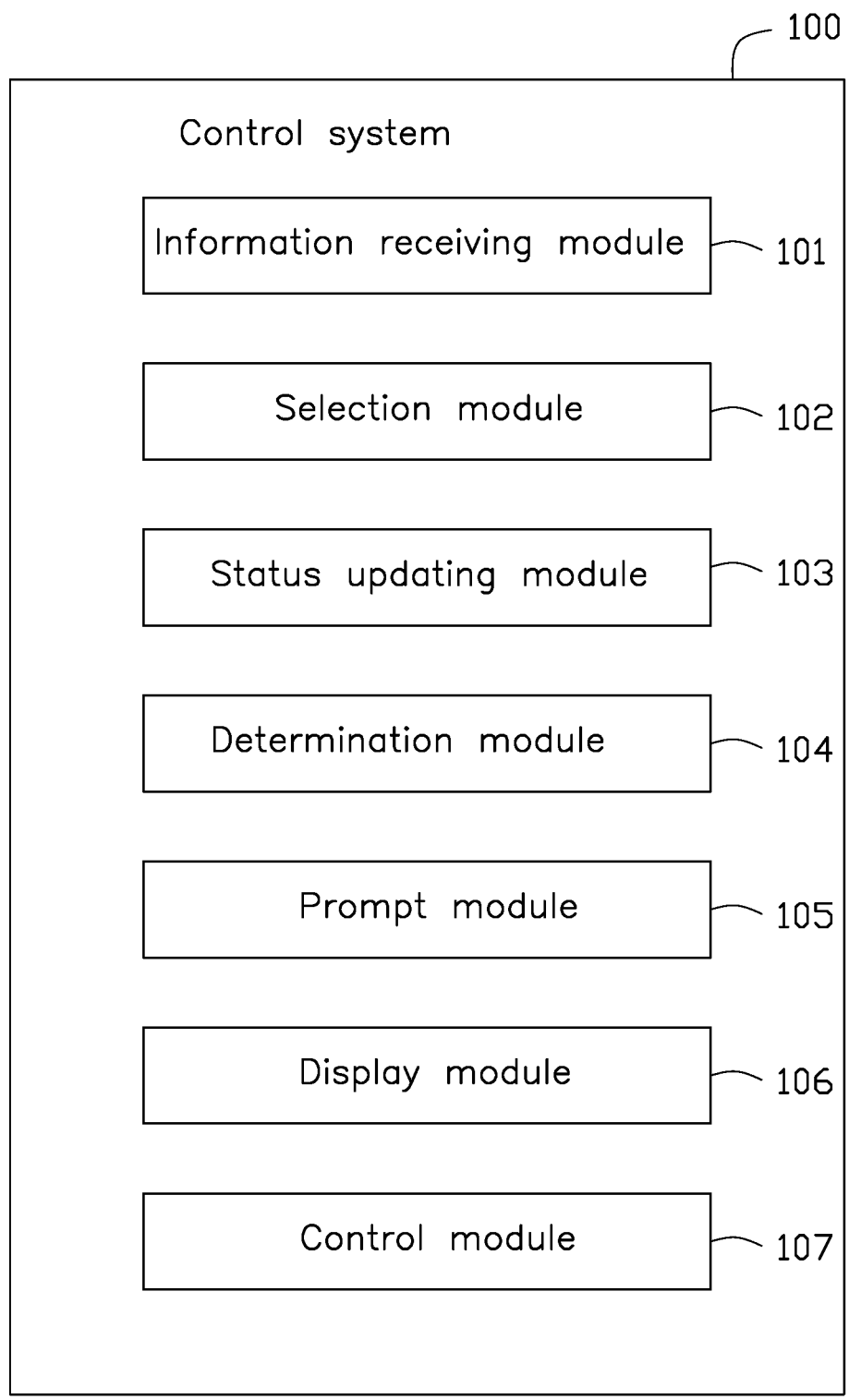
FIG. 3 is a block diagram of functional modules of a control system of the control device.

FIG. 3 shows a block diagram of functional modules of a control system 100 implemented in the control device 10. The functional modules are composed of a plurality of program code segments, which may be stored in the memory 12 and executed by the processor 11 to implement functions of the control system 100. The functional modules of the control system 100 include at least an information receiving module 101, a selection module 102, a status updating module 103, a determination module 104, a prompt module 105, a display module 106, and a control module 107.

The information receiving module 101 receives the first status information and exchange request information from the work machine 30 and second status information from the battery exchange device 20. The first status information includes at least battery power information, location information, and a motion status of the work machine 30. The second status information includes a location of the battery exchange device 20. In other embodiments, the first status information further includes a quantity of battery compartments, and the second status information further includes an exchange result. The exchange result includes "exchange complete" and "exchange incomplete".

The selection module 102 selects the battery exchange device 20 according to the first status information of the work machine 30 and the location of the plurality of battery exchange devices 20. Specifically, the control device 10 stores the location of each of the plurality of battery exchange devices 20 and selects the battery exchange device 20 located closest to the work machine 30 or closest to a movement path of the work machine 30.

The status updating module 103 updates a battery exchange status of the work machine 30. The battery exchange status includes at least one of "requesting", "selecting", "selection abnormality", "selection complete", "synchronizing", "synchronization abnormality", "synchronization complete", "exchanging", "exchange abnormality", and "exchange complete".

The determination module 104 calculates a synchronization location and a synchronization time of the work machine 30 and the battery exchange device 20 according to the first status information of the work machine 30 and generates pre-judgment information. The pre judgment information includes at least the synchronization location and the synchronization time. The determination module 104 determines, according to the first status information and the second status information, whether synchronization of the work machine 30 and the battery exchange device 20 is complete. The determination module 104 determines according to the first status information or the second status information whether the battery is replaced. The determination module 104 further confirms the quantity of battery compartments according to the first status information and selects a battery exchange manner according to the quantity of battery compartments. The battery exchange manner includes exchanging the battery when the work machine 30 is stopped and exchanging the battery when the work machine 30 is moving. The pre judgment information further includes the battery exchange manner.

The prompt module 105 issues a prompt when an abnormality in the battery exchange status occurs. The prompt includes at least one of an audible and visual prompt, a short message prompt, and an email prompt. The abnormality includes the synchronization abnormality, the selection abnormality, and the exchange abnormality.

The display module 106 controls the display unit 14 to display the battery exchange status.

The control module 107 sends the pre-judgment information and a synchronization command to the battery exchange device 20 to control the battery exchange device 20 to move toward the work machine 30. After synchronization of the work machine 30 and the battery exchange device 20 is complete, the control module 107 sends a battery exchange command to the battery exchange device 20 to control the battery exchange device 20 to exchange the battery of the work machine 30. When the battery exchange is completed, the control module 107 sends a command to the battery exchange device 20 to control the battery exchange device 20 to return to a base and take the exchanged battery to the base for charging. In other embodiments, the control module 107 sends the pre-judgment information to the work machine 30.

The control device 10 receives the first status information and the exchange request information from the work machine 30, and the control device 10 generates the pre-judgment information according to the first status information and sends the pre-judgment information and the synchronization command to the battery exchange device 20 to control the battery exchange device 20 to move toward the work machine 30 according to the pre judgment information. After the synchronization is completed, the control device 10 sends the battery exchange command to the battery exchange device 20, and the battery exchange device 20 replaces the battery of the work machine 30 according to the battery exchange command. After the battery exchange is completed, the control device 10 sends the command to the battery exchange device 20 to return to the base.

In one embodiment, the work machine 30 includes one battery compartment, and the control device 10 sends the pre judgment information to the battery exchange device 20 and the work machine 30. After the work machine 30 and the battery exchange device 20 arrive at the location according to the pre-judgment information, the battery of the work machine 30 is replaced by the battery exchange device 20.

In another embodiment, the work machine 30 includes a plurality of battery compartments. When the work machine 30 and the battery exchange device 20 reach a predetermined location and achieve synchronization such that a speed of the battery exchange device 20 is the same as a speed of the work machine 30, the battery exchange device 20 first exchanges the battery of one of the battery compartments, and then the battery exchange device 20 exchanges the battery of a next one of the battery compartments, thereby realizing battery exchange of the work machine 30 while the work machine 30 is moving. Thus, the battery exchange does not affect operation of the work machine 30.

Figure 4:
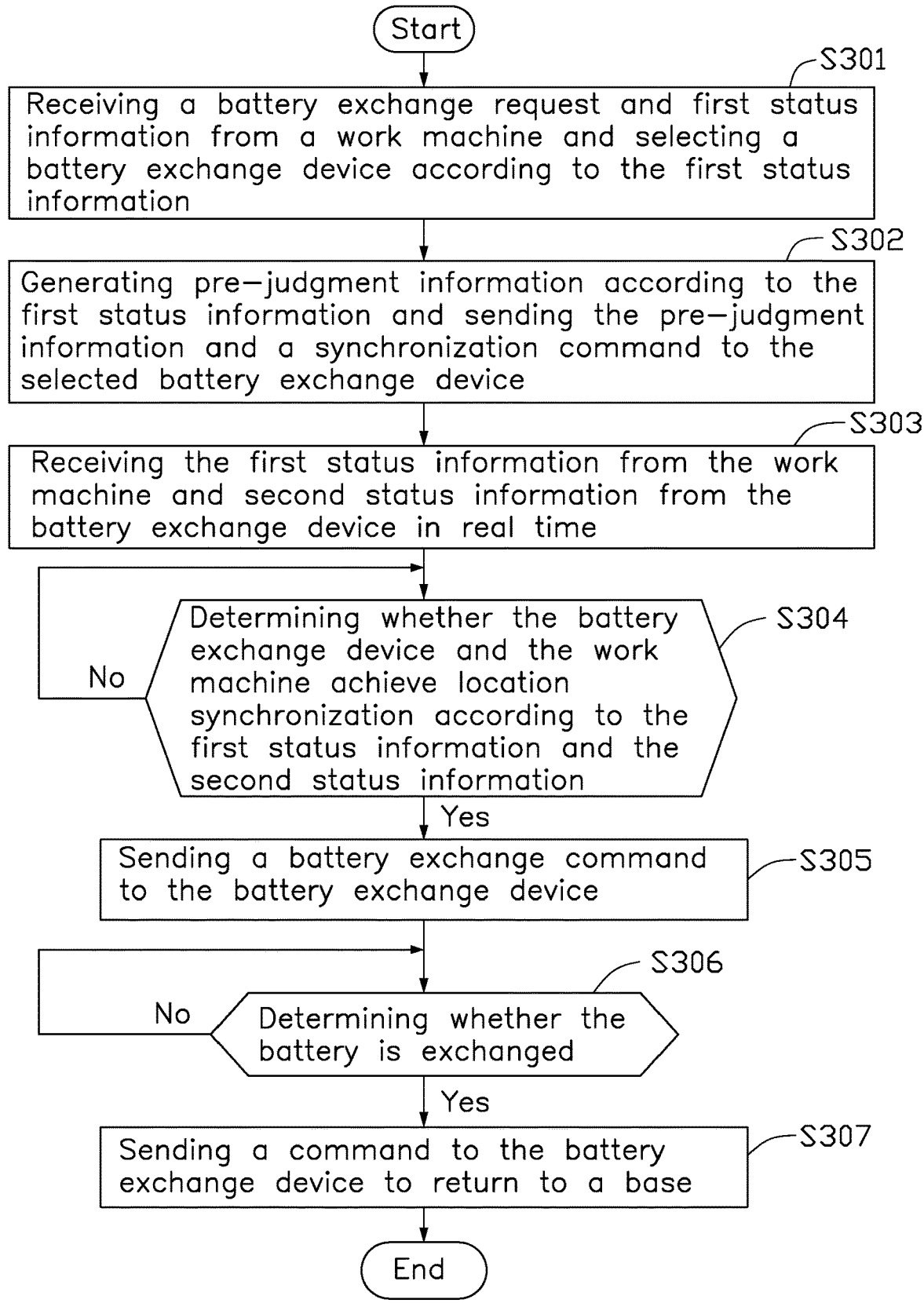
FIG. 4 is a flowchart of a battery exchange method.

FIG. 4 shows a flowchart of a battery exchange method. The battery exchange method is provided by way of embodiment, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S301, a battery exchange request and first status information are received from a work machine 30, and a battery exchange device 20 is selected according to the first status information.

Specifically, the control device 10 stores the location of each of the plurality of battery exchange devices 20 and receives the first status information from the work machine 30. The first status information includes at least battery power information, location information, and a motion status of the work machine 30. The control device 10 selects a suitable battery exchange device 20 according to the first status information and the location of the battery exchange device 20. For example, the battery exchange device 20 closest to the location of the work machine 30 or the battery exchange device 20 closest to the path of the work machine 30 is selected. The control device 10 updates the battery exchange status of the work machine 30 to "selection complete".

In one embodiment, when the battery power of the work machine 30 is less than a preset value, the work machine 30 transmits the battery exchange request and the first status information to the control device 10.

In another embodiment, the control device 10 determines whether the battery needs to be replaced according to the battery power information and selects the battery exchange device 20 when it is determined that the battery needs to be replaced.

At block S302, the pre-judgment information is generated according to the first status information, and the pre-judgment information and the synchronization command are sent to the selected battery exchange device 20 to control the selected battery exchange device 20 to move toward the work machine 30.

Specifically, the control device 10 calculates the location and synchronization time at which the work machine 30 and the battery exchange device 20 can realize synchronous motion based on the first status information and generates the pre-judgment information. The pre judgment information includes a synchronization location and a synchronization time, which is an approximate time at which the work machine 30 and the battery exchange device 20 reach the synchronization location. The control device 10 sends the synchronization command and the pre-judgment information to the selected battery exchange device 20 to control the battery exchange device 20 to move toward the work machine 30 according to the pre-judgment information and the synchronization command, and the control device 10 updates the battery exchange status of the work machine 30 to "synchronizing".

In one embodiment, the first status information further includes the quantity of battery compartments and selects a battery exchange manner according to the quantity of battery compartments. The battery exchange manner includes exchanging the battery when the work machine 30 is stopped and exchanging the battery when the work machine 30 is moving. The pre-judgment information further includes the battery exchange manner.

At block S302, the quantity of battery compartments in the work machine 30 is determined according to the first status information. If the quantity of the battery compartments is one, the exchange manner is to replace the battery when the work machine 30 is stopped. If the quantity of battery compartments is more than one, the exchange manner is to replace the battery while the work machine 30 is moving.

At block S303, the first status information from the work machine 30 and the second status information from the battery exchange device 20 are received in real time. The second status information includes at least the location of the battery exchange device 20.

At block S304, whether the battery exchange device 20 and the work machine 30 achieve location synchronization according to the first status information and the second status information is determined.

If the battery exchange device 20 and the work machine 30 achieve location synchronization, block S305 is implemented. If the battery exchange device 20 and the work machine 30 have not achieved location synchronization, block S304 is repeated.

At block S305, a battery exchange command is sent to the battery exchange device 20 to control the battery exchange device 20 to exchange the battery of the work machine 30.

Specifically, after location synchronization is achieved, the battery exchange status of the work machine 30 is updated to "synchronization complete", and the control device 10 sends a battery exchange command to the battery exchange device 20 to control the battery exchange device 20 to exchange the battery of the work machine 30.

At block S306, whether the battery is exchanged is determined.

Specifically, the control device 10 determines whether the battery is replaced according to the battery power information in the first status information.

In other embodiments, the second status information further includes an exchange result information. The exchange result includes "exchange complete" and "exchange incomplete". The control device 10 further determines whether the battery is exchanged according to the exchange result information in the second status information.

If the battery is replaced, block S307 is implemented. If the battery is not replaced, block S306 is implemented.

At block S307, a command to return to a base is sent to the battery exchange device 20 to control the battery exchange device 20 to take the exchanged battery to the base for charging. Then, the battery exchange status is updated to "exchange complete".

In other embodiments, after block S307, the control device 10 displays the battery exchange status. Specifically, the control device 10 controls the display unit 14 to display the battery exchange status. If the battery exchange status is updated to "synchronization abnormality", "selection abnormality", or "exchange abnormality", the control device 10 issues a prompt. The prompt includes at least one of an audible and visual prompt, a short message prompt, and an email prompt.

In other embodiments, blocks S306 and S307 may be omitted.

In the above-described battery exchange method, the control device 10 receives the first status information and the exchange request information from the work machine 30, and the control device 10 generates the pre-judgment information according to the first status information and sends the pre-judgment information and the synchronization command to the battery exchange device 20 to control the battery exchange device 20 to move toward the work machine 30 according to the pre-judgment information. After the synchronization is completed, the control device 10 sends the battery exchange command to the battery exchange device 20, and the battery exchange device 20 replaces the battery of the work machine 30 according to the battery exchange command. After the battery exchange is completed, the control device 10 sends the command to the battery exchange device 20 to return to the base. The battery exchange method enables the battery exchange device 20 to replace the battery of the work machine 30 to minimize influence on work of the work machine 30.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A control device comprising:
a communication unit communicatively coupled to at least one work machine and at least one battery exchange device;
a processor; and
a memory storing a plurality of instructions, which when executed by the processor, cause the processor to:
receive a battery exchange request and first status information from the work machine and second status information from the at least one battery exchange device, the first status information comprising at least battery power information, location information, and a motion status of the work machine, the second status information comprising at least location information of the at least one battery exchange device;
calculate a synchronization location and a synchronization time of the work machine and the battery exchange device according to the first status information of the at least one work machine and generate pre-judgment information, the pre-judgment information comprising at least the synchronization location and the synchronization time;
determine, according to the first status information and the second status information, whether synchronization of the at least one work machine and the at least one battery exchange device is complete;
send the pre-judgment information and a synchronization command to a corresponding battery exchange device to control the battery exchange device to move toward the work machine; and
send a battery exchange command to the corresponding battery exchange device when the battery exchange device achieves synchronization with the work machine to control the battery exchange device to exchange the battery of the work machine,
wherein the first status information further comprises a quantity of battery compartments of the work machine;
the processor confirms the quantity of battery compartments according to the first status information and selects a battery exchange manner according to the quantity of battery compartments;
the battery exchange manner comprises exchanging the battery when the work machine is stopped, and exchanging the battery when the work machine is moving;
the pre-judgment information further comprises the battery exchange manner;
the processor sends the pre-judgment information to the work machine.

2. The control device of claim 1, wherein:
the memory stores a location of a plurality of battery exchange devices; and
after receiving the battery exchange request and the first status information from the work machine, the processor selects a corresponding battery exchange device from the plurality of battery exchange devices according to the first status information and the location of the plurality of battery exchange devices.

3. The control device of claim 1, wherein:
after sending the battery exchange command to the battery exchange device, the processor determines whether the battery exchange has completed according to the first status information or the second status information;
after the battery exchange is completed, the processor sends a command to the battery exchange device to return to a base to control the battery exchange device to take an exchanged battery to the base for charging.

4. The control device of claim 3, further comprising a display unit, wherein:
the processor updates a battery exchange status of the work machine, the battery exchange status comprises at least one of requesting, selecting, selection abnormality, selection complete, synchronizing, synchronization abnormality, synchronization complete, exchanging, exchange abnormality, and exchange complete;
the processor controls the display unit to display the battery exchange status;
the processor issues a prompt when an abnormality in the battery exchange status occurs;
the prompt comprises at least one of an audible and visual prompt, a short message prompt, and an email prompt.

5. The control device of claim 4, wherein:
the abnormality comprises the synchronization abnormality, the selection abnormality, and the exchange abnormality.

6. A battery exchange method implemented in a control device communicatively coupled to at least one work machine and at least one battery exchange device, the battery exchange method comprising:
receiving a battery exchange request and first status information from the work machine, the first status information comprising at least battery power information, location information, and a motion status of the work machine;
calculating a synchronization location and a synchronization time of the work machine and the battery exchange device according to the first status information, generating pre-judgment information, and sending the pre judgment information and a synchronization command to the battery exchange device to control the battery exchange device to move toward the work machine according to the pre-judgment information and the synchronization command, the pre judgment information comprising at least the synchronization location and the synchronization time;
continually receiving the first status information from the work machine and second status information from the battery exchange device, the second status information comprising at least location information of the battery exchange device;
determining, according to the first status information and the second status information, whether synchronization of the work machine and the battery exchange device is complete; and
sending a battery exchange command to the battery exchange device when the battery exchange device achieves synchronization with the work machine to control the battery exchange device to exchange the battery of the work machine,
wherein the pre-judgment information further comprises a battery exchange manner;
the battery exchange manner comprises exchanging the battery when the work machine is stopped and exchanging the battery when the work machine is moving;
the first status information further comprises a quantity of battery compartments of the work machine;
the quantity of battery compartments of the work machine is confirmed when generating the pre-judgment information;

the processor confirms the quantity of battery compartments according to the first status information and selects a battery exchange manner according to the quantity of battery compartments;

if the quantity of the battery compartments is one, the exchange manner is to replace the battery when the work machine is stopped;

if the quantity of battery compartments is more than one, the exchange manner is to replace the battery while the work machine is moving.

7. The battery exchange method of claim 6, wherein:

the second status information further comprises an exchange result;

the exchange result comprises exchange complete and exchange incomplete;

whether the battery is exchanged is determined according to the first status information or the second status information;

after the battery is exchanged, a command is sent to the battery exchange device to control the battery exchange device to return to a base and take the exchanged battery to the base for charging.

8. The battery exchange method of claim 6, wherein:

the control device stores a location of the at least one battery exchange device; and after receiving the battery exchange request and the first status information from the work machine, a battery exchange device is selected from the at least one battery exchange device according to the first status information and the location of the battery exchange device.

9. The battery exchange method of claim 6, further comprising:

updating a battery exchange status of the work machine in real time, the battery exchange status comprising at least one of requesting, selecting, selection abnormality, selection complete, synchronizing, synchronization abnormality, synchronization complete, exchanging, exchange abnormality, and exchange complete;

displaying the battery exchange status in real time; and issuing a prompt when an abnormality in the battery exchange status occurs, the prompt comprising at least one of an audible and visual prompt, a short message prompt, and an email prompt.

10. The battery exchange method of claim 9, wherein:

the abnormality comprises the synchronization abnormality, the selection abnormality, and the exchange abnormality.

* * * * *